United States Patent
Pai et al.

(10) Patent No.: US 11,846,862 B1
(45) Date of Patent: Dec. 19, 2023

(54) FRONT LIGHTING STRUCTURE OF ELECTRONIC PAPER DISPLAY

(71) Applicants: Chih-Chiang Pai, Taoyuan (TW); Meng-Kuei Lin, Taoyuan (TW); Chin-An Tsai, Taoyuan (TW); Li-Yeh Yang, Taoyuan (TW); Yi-Jing Huang, Taoyuan (TW); Chih-Jung Tsui, Taoyuan (TW)

(72) Inventors: Chih-Chiang Pai, Taoyuan (TW); Meng-Kuei Lin, Taoyuan (TW); Chin-An Tsai, Taoyuan (TW); Li-Yeh Yang, Taoyuan (TW); Yi-Jing Huang, Taoyuan (TW); Chih-Jung Tsui, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 18/116,875

(22) Filed: Mar. 3, 2023

Related U.S. Application Data

(63) Continuation-in-part of application No. 18/094,140, filed on Jan. 6, 2023.

(51) Int. Cl.
*G02F 1/1677* (2019.01)
*F21V 8/00* (2006.01)

(52) U.S. Cl.
CPC ......... *G02F 1/1677* (2019.01); *G02B 6/0068* (2013.01); *G02B 6/0088* (2013.01)

(58) Field of Classification Search
CPC ........ G02B 6/0011–0088; G02F 1/1675–1677
See application file for complete search history.

(56) References Cited

U.S. PATENT DOCUMENTS 9,360,696 B1 * 6/2016 Ghali .................... G06F 1/1643

* cited by examiner

*Primary Examiner* — Jason M Han

(57) ABSTRACT

A lighting structure includes a surface cover plate, a lighting module, a light adjustment layer, an optical adhesive layer and an electronic paper display module. The surface cover plate has a visible area and a black bezel. The lighting module has a light guide plate and point light sources. The light adjustment layer has an optical thinning region and a frame-shaped adhesive. The optical thinning region is less than the light guide plate in refractive index. The surface cover plate and the lighting module are adhered by the frame-shaped adhesive. The optical thinning region is disposed on an upper surface of the light guide plate. The optical adhesive layer has a refractive index equal to or greater than a refractive index of the light guide plate. The electronic paper display module is disposed under the lighting module.

7 Claims, 3 Drawing Sheets

FRONT LIGHTING STRUCTURE OF ELECTRONIC PAPER DISPLAY

CROSS-REFERENCE TO RELATED APPLICATIONS

This application is a continuation-in-part of U.S. patent application Ser. No. 18/094,140 filed Jan. 16, 2023.

BACKGROUND

Technical Field

The invention relates to electronic paper displays, particularly to an improved front lighting structure of an electronic paper display.

Related Art

An electronic paper display has properties of simulating paper, such as flexibility, wide viewable angle, light weight, high definition, high contrast and indoor and outdoor readability, and has an advantage of low power consumption, so it has been widely applied to various electronic devices. An electronic paper display itself is not illuminant and usually needs environment light as a light source to the display. However, in low-light circumstances such as an indoor space, the displaying quality will be seriously affected. As a result, a current electronic paper display is usually provided with a lighting module to provide auxiliary illumination to guarantee the displaying quality. The lighting module is installed on the front of an electronic paper display to provide auxiliary illumination to the electronic paper display.

As shown in FIGS. 1 and 2, a lighting module 30 includes a light guide plate 31 and one or more point lights 32 disposed outside a lateral side edge. The light guide plate 31 can convert the point lights 32 into an area light source to provide even illumination to the display of the electronic paper display module 50. The lighting module 30 is sandwiched between a surface cover plate 10 and the electronic paper display module 50 and an optical adhesive layer 40 is used to glue the lamination as an integral. A peripheral area of the bottom surface of the surface cover plate 10 is disposed with an opaque black bezel 12 as a decorative bezel for cloaking the marginal circuit. The point lights 32 of the lighting module are under the black bezel 12.

However, such a lighting structure installed on the front of an electronic paper display often causes ghosting on the display near the black bezel 12, which affects the visibility of the electronic paper display. The refractive index of each of the optical adhesive layer 40 and the light guide plate 31 is approximately between 1.47 and 1.51. The both are very similar in refractive index, the optical adhesive layer 40 will damage the total reflection effect of the surface of the light guide plate 30 when the both are adhered together, so the light from the point lights 32 emitted into a lateral side of the light guide plate 31 will be partially refracted to the optical adhesive layer 40 and the surface cover plate 10 and the refracted light will be affected by the black bezel 12 to cause a dark or bright light texture SD on the display near the black bezel 12. This will affect the appearance and reduce the viewability of the display. It is an issue to be solved.

SUMMARY

An object of the invention is to provide an improved lighting structure installed on the front of an electronic paper display, which can eliminate the ghosting of the display near the black bezel to make the illumination of the electronic paper display even and bright.

To accomplish the above object, the invention provides a front lighting structure of an electronic paper display, which includes: a surface cover plate, a central portion of the surface cover plate being a visible area, and a peripheral area of a bottom surface of the surface cover plate being disposed with a black bezel made of an opaque material or a low-transmittance material; a lighting module, having a light guide plate and point light sources, the point light sources being disposed outside a side of the light guide plate; a light adjustment layer, a central portion of the light adjustment layer being an optical thinning region, a peripheral area of the light adjustment layer being disposed with a frame-shaped adhesive, the optical thinning region being equal to or greater than the visible area in area, the optical thinning region being less than the light guide plate in refractive index, the frame-shaped adhesive having a size corresponding to the back bezel, wherein the surface cover plate and the lighting module are adhered by the frame-shaped adhesive of the light adjustment layer, and the optical thinning region is disposed on an upper surface of the light guide plate; an optical adhesive layer, having a refractive index equal to or greater than a refractive index of the light guide plate; and an electronic paper display module, disposed under the lighting module, and the electronic paper display module and a bottom surface of the light guide plate being adhered by the optical adhesive layer.

According to the invention, a refractive index of the optical thinning region approaches 1. Preferably, the optical thinning region is an air layer or a vacuum layer.

In an embodiment, the optical thinning region is a transparent resin layer whose refractive index is less than 1.40.

According to the invention, a size difference between an inner edge of the frame-shaped adhesive and an inner edge of the black bezel is above 500 μm.

According to the invention, the frame-shaped adhesive is one of optical clear adhesive (OCA), optical clear resin (OCR), solid optically clear adhesive (SCA) or opaque double-side tape.

According to the invention, the optical adhesive layer is optical clear adhesive (OCA), optical clear resin (OCR) or solid optically clear adhesive (SCA).

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
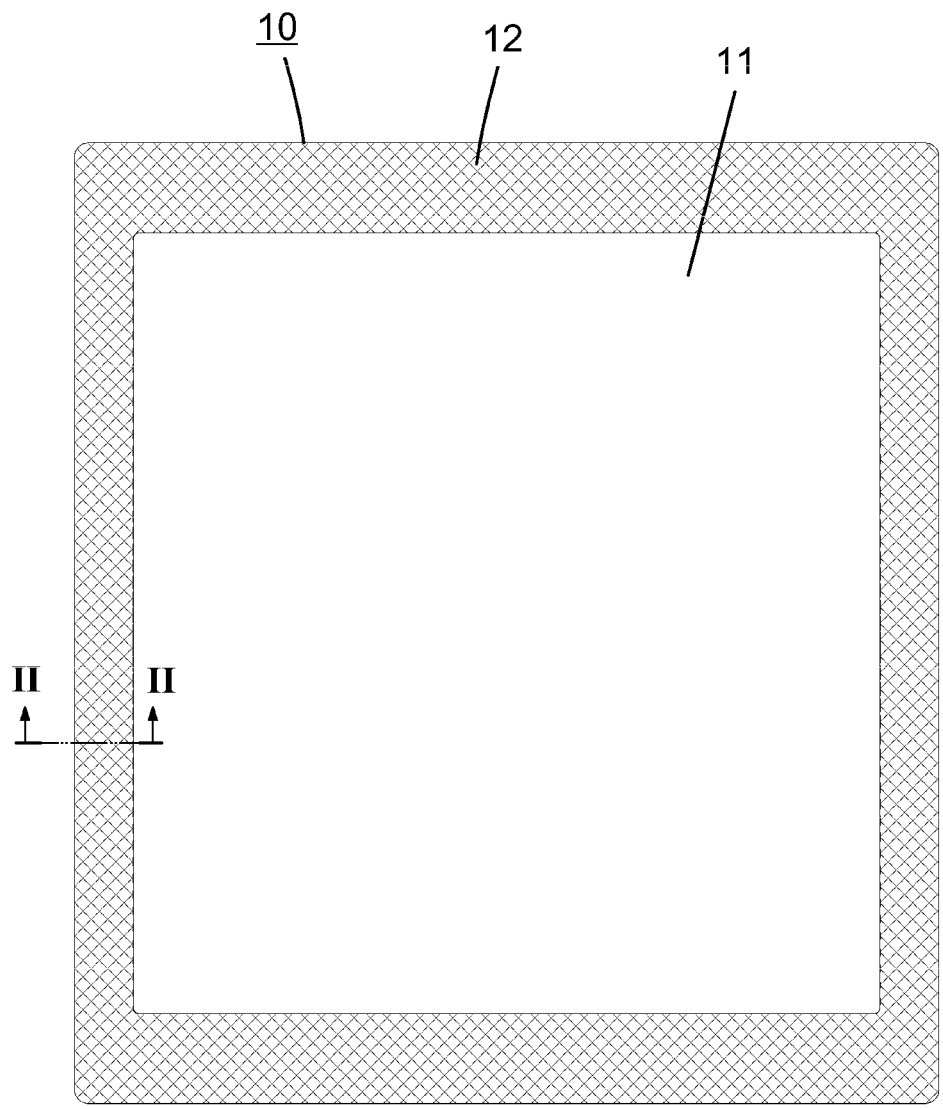
FIG. 1 is a schematic plan view of a conventional electronic paper display.
Figure 2:
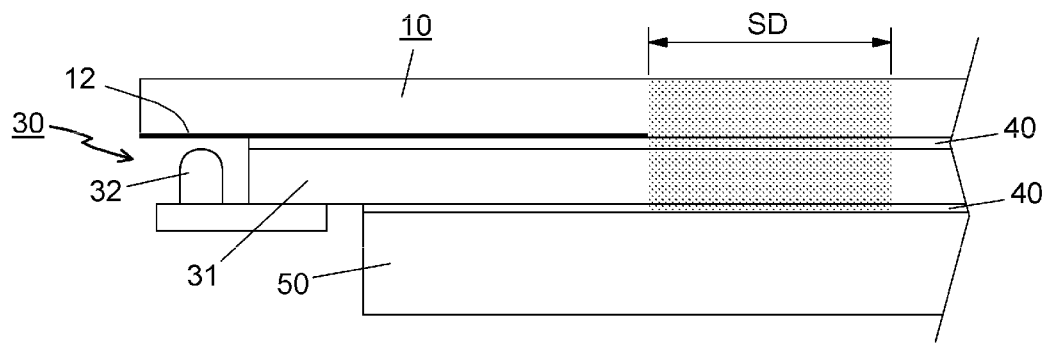
FIG. 2 is a cross-sectional view of the lamination structure along line II-II in FIG. 1.
Figure 3:
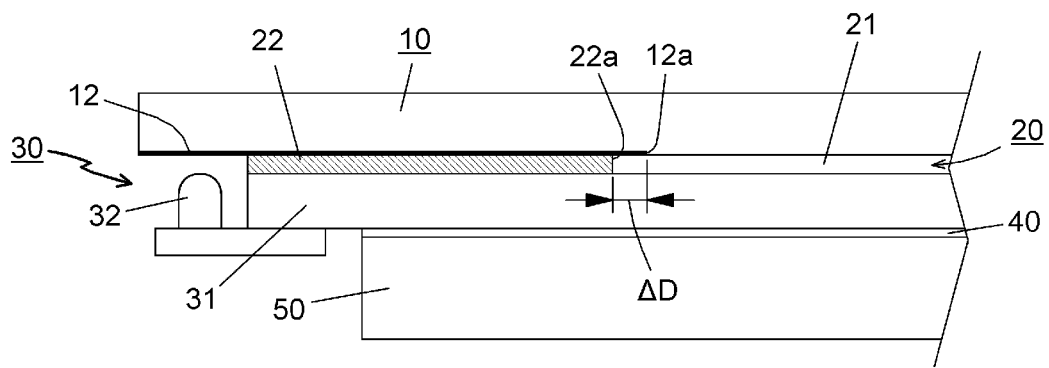
FIG. 3 is a cross-sectional view of the lamination structure of the invention.
Figure 4:
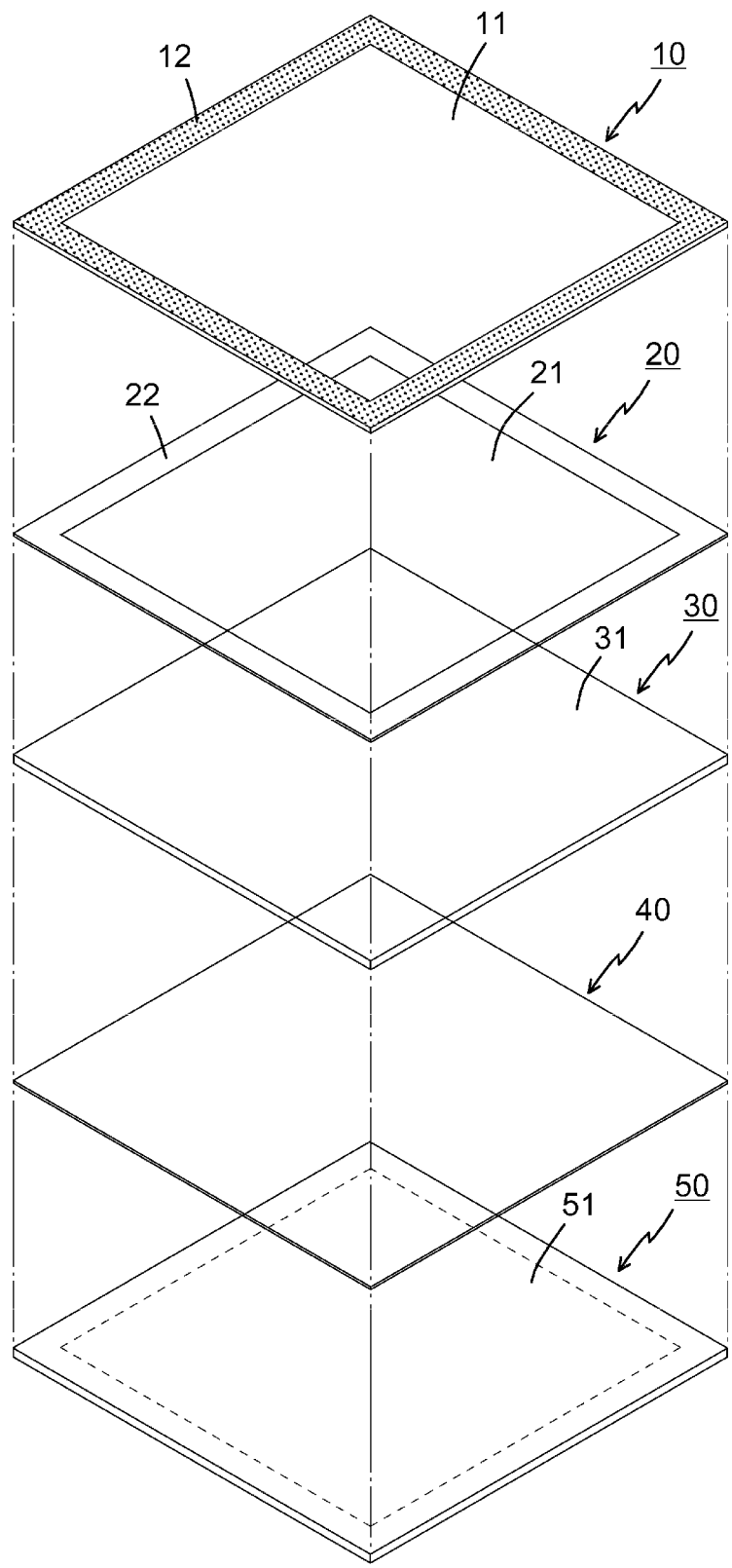
FIG. 4 is an exploded view of the lamination structure of the invention.

FIGS. 3 and 4 show a preferred embodiment of the invention, whose lamination includes a surface cover plate 10, a lighting module 30, a light adjustment layer 20, an optical adhesive layer 40 and an electronic paper display module 50 in order.

The surface cover plate 10 is a thin plate with great mechanic strength and high light transmittance and is made of, but not limited to, various glass, polycarbonate (PC), polymethylmethacrylate (PMMA) and polyester (PET), cyclic olefin copolymer (COC) or cyclic olefin polymer (COP). A central portion of the surface cover plate 10 is a transparent visible area 11, and a peripheral area of a bottom surface of the surface cover plate 10 is disposed with a black bezel 12 which is an opaque or low-transmittance film made of a non-conductive material. The non-conductive material may adopt, but not limited to, ink or photoresist. The non-conductive material may use printing, sputtering or coating to form a film with a thickness greater than 15 µm on the peripheral area of the bottom surface of the surface cover plate 10. The black bezel 12 of the surface cover plate 10 can cloak both the point light sources 32 on a side of the lighting module 30 thereunder and the marginal circuit area of the electronic paper display module 50 to improve the appearance of the overall device.

The lighting module 30 includes a light guide plate 31 and at least one point light source 32 disposed outside a side of the light guide plate 31. The point light source 32 may adopt an LED or a micro-LED. The point light source 32 emits light from a side edge of the light guide plate 31 and the light is converted into a downward area light source. The area of the light guide plate 31 matches the viewable area 51 of the electronic paper display module 50 to provide great illumination to the viewable area 51 of the electronic paper display module 50. The light guide plate 31 is made of, but not limited to, polycarbonate (PC), polymethylmethacrylate (PMMA) or polyester (PET). To make the light guide plate 31 form an area light source with even light distribution, the plate body of the light guide plate 31 may be disposed with multiple light diffusing points (not shown) to convert the incident light from the point light sources 32 into light which is evenly distributed on the plate body. The light diffusing points may adopt a material whose refractive index is greater than that of the light guide plate 31 or may be formed by indents or bumps on the plate body of the light guide plate 31. A sparse and dense distribution of the light diffusing points on the light guide plate 31 can also make an effect of even and bright illumination on the light guide plate 31.

The light adjustment layer 20 is disposed between the surface cover plate 10 and the lighting module 30. A central portion of the light adjustment layer 20 is an optical thinning region with a low refractive index, and a peripheral area of the light adjustment layer 20 is disposed with a frame-shaped adhesive 22. The optical thinning region 21 is equal to or slightly greater than the visible area 11 of the surface cover plate 10 in area, and the optical thinning region 21 is less than the light guide plate 31 in refractive index. Preferably, the refractive index of the optical thinning region 21 is an air layer or a vacuum layer whose refractive index approaches 1. In other available solutions, when the light guide plate 31 is made of PMMA with a refractive index of 1.491, and the optical thinning region 21 may adopt a transparent resin material whose refractive index is less than 1.40, such as NTT-AT® acrylic resin #18204 whose refractive index is 1.375. In addition, the frame-shaped adhesive 22 has a size corresponding to the back bezel 12. Preferably, the size difference ΔD between the inner edge 22a of the frame-shaped adhesive 22 and the inner edge 12a of the black bezel 12 is above 500 µm to reduce the processing accuracy and simplify the technology difficulty. The frame-shaped adhesive 22 may be of one of various adhesives, such as, but not limited to, optical clear adhesive (OCA), optical clear resin (OCR), solid optically clear adhesive (SCA) or opaque double-side tape.

The optical adhesive layer 40 may adopt commercially available optically clear adhesives, such as optical clear adhesive (OCA), optical clear resin (OCR), solid optically clear adhesive (SCA). The optical adhesive layer 40 has a refractive index equal to or greater than a refractive index of the light guide plate 31.

The electronic paper display module 50 is a reflective display which has lower power consumption and flexibility and utilizes the electrophoretic technology or the cholesteric liquid crystal technology to present the image signal onto the display surface of the electronic paper display module 50 (i.e., a viewable area 51) as an image.

As shown in FIGS. 3 and 4, the surface cover plate 10 and the lighting module 30 are adhered by the frame-shaped adhesive 22 of the light adjustment layer 20, and the optical thinning region of the light adjustment layer 20 is disposed on an upper surface of the light guide plate 31. The optical thinning region 21 is less than the light guide plate 31 in refractive index, so a total reflection interface may be formed on the upper surface of the light guide plate 31 and the light entering a lateral side of the light guide plate 31 will not upward refracted out to be disadvantageously affected by the black bezel 12. As a result, the ghosting appearing on the display bear the black bezel 12 can be improved. In addition, the optical adhesive layer 40 glues the electronic paper display module 50 and the bottom surface of the light guide plate 31 of the lighting module 30, and the optical adhesive layer 40 has a refractive index equal to or greater than a refractive index of the light guide plate 31, so the light in the light guide plate 31 can smoothly pass both the bottom surface of the light guide plate 31 and the optical adhesive layer 40 to reach the viewable area 51 of the electronic paper display module 50 to provide great illumination.

While this disclosure has been described by means of specific embodiments, numerous modifications and variations could be made thereto by those skilled in the art without departing from the scope and spirit of this disclosure set forth in the claims.

What is claimed is:

1. A front lighting structure of an electronic paper display, comprising:
    a surface cover plate, a central portion of the surface cover plate being a visible area, and a peripheral area of a bottom surface of the surface cover plate being disposed with a black bezel made of an opaque material or a low-transmittance material;
    a lighting module, having a light guide plate and point light sources, the point light sources being disposed outside a side of the light guide plate;
    a light adjustment layer, a central portion of the light adjustment layer being an optical thinning region, a peripheral area of the light adjustment layer being disposed with a frame-shaped adhesive, the optical thinning region being equal to or greater than the visible area in area, the optical thinning region being less than the light guide plate in refractive index, the frame-shaped adhesive having a size corresponding to the back bezel, wherein the surface cover plate and the lighting module are adhered by the frame-shaped adhesive of the light adjustment layer, and the optical thinning region is disposed on an upper surface of the light guide plate;

an optical adhesive layer, having a refractive index equal to or greater than a refractive index of the light guide plate; and an electronic paper display module, disposed under the lighting module, and the electronic paper display module and a bottom surface of the light guide plate being adhered by the optical adhesive layer.

2. The front lighting structure of claim 1, wherein a refractive index of the optical thinning region approaches 1.

3. The front lighting structure of claim 2, wherein the optical thinning region is an air layer or a vacuum layer.

4. The front lighting structure of claim 1, wherein the optical thinning region is a transparent resin layer whose refractive index is less than 1.40.

5. The front lighting structure of claim 1, wherein a size difference between an inner edge of the frame-shaped adhesive and an inner edge of the black bezel is above 500 μm.

6. The front lighting structure of claim 1, wherein the frame-shaped adhesive is one of optical clear adhesive (OCA), optical clear resin (OCR), solid optically clear adhesive (SCA) or opaque double-side tape.

7. The front lighting structure of claim 1, wherein the optical adhesive layer is optical clear adhesive (OCA), optical clear resin (OCR) or solid optically clear adhesive (SCA).

* * * * *